UNITED STATES PATENT OFFICE.

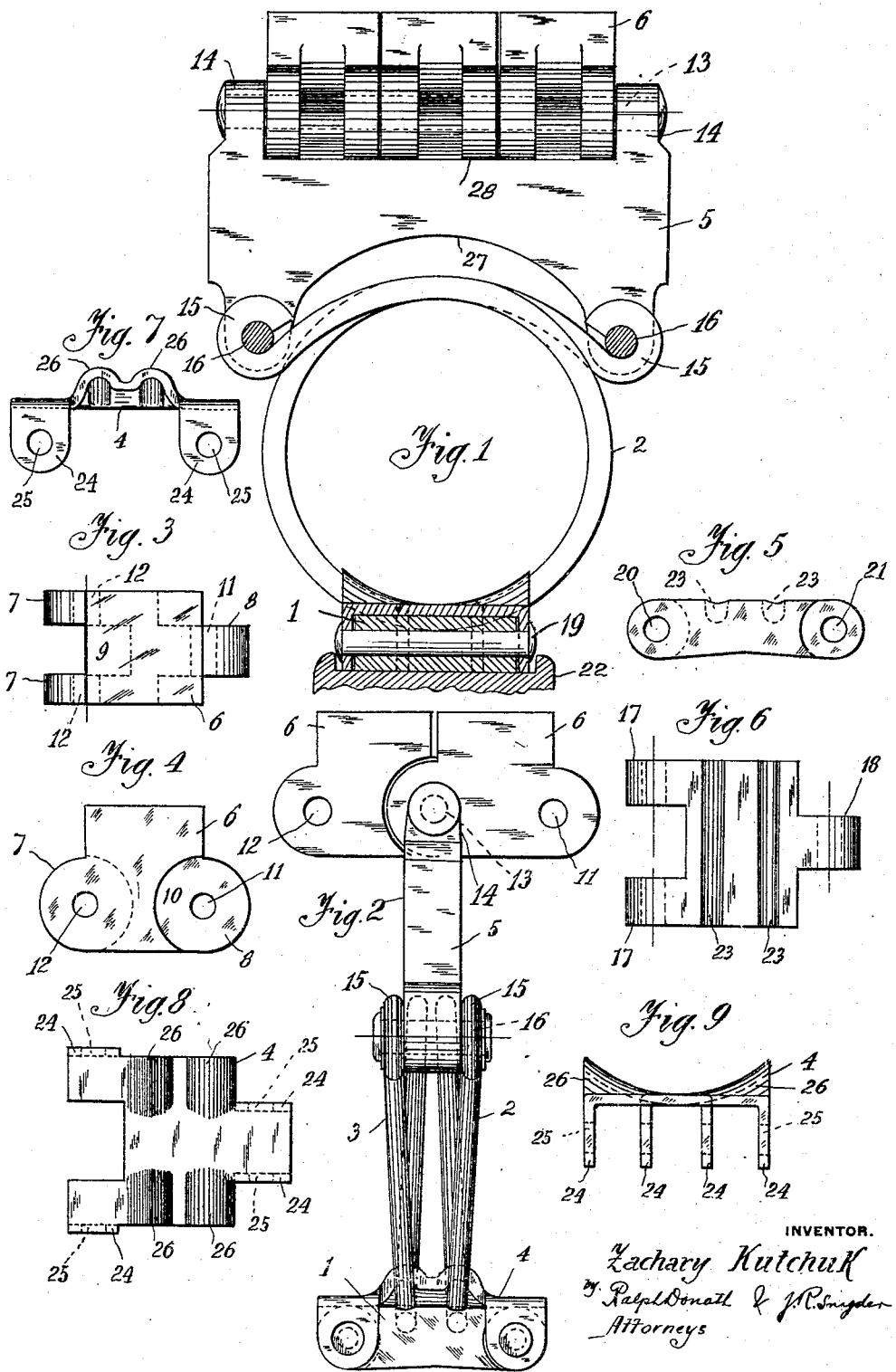

ZACHARY KUTCHUK, OF SOUTHWEST, PENNSYLVANIA.

SPRING-TIRE.

1,308,908.　　　　　　　　Specification of Letters Patent.　　　Patented July 8, 1919.

Application filed October 21, 1918.　Serial No. 259,088.

*To all whom it may concern:*

Be it known that I, ZACHARY KUTCHUK, a subject of the Government of Russia, residing at Southwest, in the county of Westmoreland and State of Pennsylvania, have invented certain new and useful Improvements in Spring-Tires, of which the following is a specification.

This invention relates to improvements in spring tires and the primary object thereof is to provide a tire of the type set forth whereby the use of rubber is entirely eliminated.

Other objects of this invention are to provide a tire of the character described which is simple in its construction and arrangement, strong, durable and efficient in its use and inexpensive to manufacture.

To the accomplishment of these and such other objects as may hereinafter appear, the invention consists of the novel construction, combination and arrangement of parts herein specifically described and illustrated in the accompanying drawing wherein is shown an embodiment of the invention.

In the drawing, forming a portion of this specification and wherein like numerals of reference designate corresponding parts throughout the several views:

Figure 1 is a transverse view of one unit partly in section.

Fig. 2 is a side view thereof.

Fig. 3 is a top view of one of the tread links, and Fig. 4 a side view thereof.

Figs. 5 and 6 are side and top views, respectively, of one of the supporting links.

Figs. 7, 8 and 9 are views illustrating the construction of one of the clamping plates.

The spring tire is constructed from a plurality of sections each consisting of the supporting link 1, the coils 2 and 3 securely fastened thereon by the clamping plate 4, the supporting bar 5 connected to the ends 15 of the coils 2 and 3, and the three parallel tread links 6 secured to the supporting bar by the rivet 13 which passes through the lugs 14 of the supporting bar 5.

The tread links 6 are made preferably from blocks of metal and are provided at one end with the ears 7, and at the other with the lug 8. The ears 7 and the lug 8 are partially formed by the recesses in the tread link 6 as shown at 9 and 10, respectively.

The ears 7 and the lugs 8 are interfitting to form a continuous chain and are formed toward the inner portion of the tread link to allow a greater wearing thickness. Apertures 12 and 11 are provided in the ears 7 and lugs 8, respectively, for the reception of rivets for connecting the tread links together in a manner hereinafter described.

In forming the tread for the tire, three chains formed by the links as above described are run parallel to each other and connected together by means of the rivets 13 which pass through the lugs 14 of the supporting bars 5. It will be noted that the rivets 13 not only connect the parallel chains together and secure the tread to the supporting bars 5, but also connect the individual tread links together by its passage through the apertures 11 and 12.

The coils 2 and 3 are formed from spring steel wire and are of one complete turn each. The ends 15 of the coils are firmly secured to the supporting bar 5 by means of the rivets 16 as shown in Fig. 2 of the drawing.

The supporting links 1, provided with the ears 17 and the interfitting lugs 18, and secured together to form a chain by the rivets 19, in apertures 20 and 21, entirely embrace the periphery of the wheel rim 22. The lugs 18 are of less width than the recesses or spaces between the ears 17 to permit the insertion of the lugs 24, of the clamping plates 4, in a manner hereinafter described. The top of each link 1 has two grooves 23, which conform in curvature to the inner portion of the coils 2 and 3 which are seated therein, as shown in Fig. 2 of the drawing.

The coils 2 and 3 are securely held within the grooves 23, of the supporting link 1 by means of the clamping plate 4, which is provided with the depending lugs 24 having apertures 25. The depending lugs 24 engage the ears 17 and the lugs 18 of the supporting links 1, and apertures 25 register with the apertures 20 and 21 in the ears 17 and the lugs 18, respectively. After coils 2 and 3 are positioned upon the supporting links 1 in the grooves 23 the clamping plate 4 is placed thereon and secured to the supporting links 1 by the rivets 19, which pass through the apertures 20 and 21 in the ears 17 and the lugs 18, of the supporting links 1, and at the same time through the apertures 25 in the depending lugs 24.

The clamping plate 4 is further provided with the corrugations 26 so as to conform to the contour of the coils 2 and 3 over which it is placed, as clearly shown in Fig. 2 of the drawing.

The supporting bar 5 has a rounded inner portion 27 to accommodate the movement of the coils 2 and 3 therein. The outer portion 28 is flat and forms the seat for the tread links 6 which are mounted thereon between the lugs 14.

It will be obvious that a tire constructed from sections as herein described will be resilient and flexible, and may be placed around the tire rim and secured thereto in any desired manner.

From the foregoing description taken in connection with the accompanying drawing the construction and application of my improved tire will be readily apparent without a more extended explanation, and it is to be understood that various changes in the form, proportion and in the minor details of construction may be restored to as come within the scope of the claim hereunto appended.

What I claim as new and desire to secure by Letters Patent is:—

A spring tire comprising a plurality of supporting links flexibly riveted together, spring coils mounted on each of said supporting links, a clamping plate for securing said coils to each of said supporting links, supporting bars carried by the said coils, and a tread chain pivotally mounted in the said supporting bars and consisting of three parallel rows of tread links flexibly riveted together, substantially as described and for the purpose set forth.

In testimony whereof I affix my signature.

ZACHARY KUTCHUK.

Copies of this patent may be obtained for five cents each, by addressing the "Commissioner of Patents, Washington, D. C."